(12) United States Patent
Pfeifer et al.

(10) Patent No.: US 9,432,957 B2
(45) Date of Patent: Aug. 30, 2016

(54) METHOD AND A SYSTEM FOR HIERARCHICAL TIME SYNCHRONIZATION IN AN AD-HOC NETWORK

(71) Applicant: Rohde & Schwarz GmbH & Co. KG, Munich (DE)

(72) Inventors: Hagen Pfeifer, Munich (DE); Gerhard Gläser, Langenfeld (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 23 days.

(21) Appl. No.: 14/400,267

(22) PCT Filed: Mar. 27, 2013

(86) PCT No.: PCT/EP2013/056552
§ 371 (c)(1),
(2) Date: Nov. 10, 2014

(87) PCT Pub. No.: WO2013/182332
PCT Pub. Date: Dec. 12, 2013

(65) Prior Publication Data
US 2015/0139199 A1 May 21, 2015

(30) Foreign Application Priority Data

Jun. 8, 2012 (DE) .......... 10 2012 209 655
Jan. 21, 2013 (DE) .......... 10 2013 200 845

(51) Int. Cl.
*H04L 1/00* (2006.01)
*H04W 56/00* (2009.01)
*H04W 84/18* (2009.01)

(52) U.S. Cl.
CPC ......... *H04W 56/001* (2013.01); *H04W 56/002* (2013.01); *H04W 56/0015* (2013.01); *H04W 84/18* (2013.01)

(58) Field of Classification Search
CPC ... H04W 84/18; H04W 84/19; H04W 80/04; H04W 80/05; H04W 80/06; H04W 80/07; H04W 80/08; H04W 84/12; H04W 84/13; H04W 84/14; H04W 84/15; H04W 84/16
USPC ....... 370/254, 255, 338, 351, 310, 218, 314, 370/312, 329, 337, 347, 336
See application file for complete search history.

(56) References Cited

U.S. PATENT DOCUMENTS 6,859,463 B1 * 2/2005 Mayor ................ H04W 52/241
370/252
6,888,819 B1 * 5/2005 Mushkin ............... H04J 3/0652
370/350

(Continued)

FOREIGN PATENT DOCUMENTS

DE 112006011740 T5 7/2008
WO 2011154911 A1 12/2011

OTHER PUBLICATIONS

International Search Report for corresponding International Application No. PCT/EP2013/056552, dated Jun. 21, 2013, 3 pages.

(Continued)

*Primary Examiner* — Dady Chery
(74) *Attorney, Agent, or Firm* — Ditthavong & Steiner, P.C.

(57) ABSTRACT

In a method and in a system for time synchronization within a mobile ad-hoc network, every node ($3_1$, $3_2$, $3_3$, $3_4$, $3_5$, $3_6$, $3_7$, $3_8$) of the mobile ad-hoc network transmits a message signalling a presence (1), in each case within a given time frame. The received message signalling a presence (1) is acknowledged by every node ($3_1$, $3_2$, $3_3$, $3_4$, $3_5$, $3_6$, $3_7$, $3_8$) disposed within the transmission range of the transmitting node ($3_1$, $3_2$, $3_3$, $3_4$, $3_5$, $3_6$, $3_7$, $3_8$), in each case with an acknowledgement message (2). On the basis of the information in an acknowledgement message (2) which one of the two nodes ($3_1$, $3_2$, $3_3$, $3_4$, $3_5$, $3_6$, $3_7$, $3_8$) receives, that node ($3_1$, $3_2$, $3_3$, $3_4$, $3_5$, $3_6$, $3_7$, $3_8$) of two nodes ($3_1$, $3_2$, $3_3$, $3_4$, $3_5$, $3_6$, $3_7$, $3_8$) disposed within the transmission range of one another is specified, with the local time of which the respectively other node ($3_1$, $3_2$, $3_3$, $3_4$, $3_5$, $3_6$, $3_7$, $3_8 3_1$, $3_2$, $3_3$, $3_4$, $3_5$, $3_6$, $3_7$, $3_8$) synchronizes its local time.

17 Claims, 9 Drawing Sheets

(56) References Cited

U.S. PATENT DOCUMENTS

| | | |
|---|---|---|
| 2002/0018448 A1 | 2/2002 | Amis et al. |
| 2003/0117991 A1 | 6/2003 | Beyer et al. |
| 2005/0058084 A1* | 3/2005 | Hester .................. H04W 48/16 370/254 |
| 2005/0169233 A1 | 8/2005 | Kandala |
| 2006/0198346 A1* | 9/2006 | Liu ...................... H04W 40/24 370/338 |
| 2007/0050523 A1 | 3/2007 | Emeott et al. |
| 2010/0157975 A1 | 6/2010 | In et al. |
| 2010/0238890 A1 | 9/2010 | Mo et al. |
| 2012/0287948 A1* | 11/2012 | Ruffini .................. H04J 3/0658 370/503 |
| 2013/0039220 A1* | 2/2013 | Ruffini .................. H04J 3/0679 370/255 |

OTHER PUBLICATIONS

Sichitiu et al., "Simple, Accurate Time Synchronization for Wireless Sensor Networks," IEEE Wireless Communications and Networking Conference Record, vol. 2, pp. 1266-1273, Mar. 16, 2003.

Notification of Transmittal of Translation of the International Preliminary Report on Patentability; International Preliminary Report on Patentability; Written Opinion of the International Searching Authority or corresponding International Application No. PCT/EP2013/056552, dated Dec. 18, 2014, 9 pages.

* cited by examiner

METHOD AND A SYSTEM FOR HIERARCHICAL TIME SYNCHRONIZATION IN AN AD-HOC NETWORK

CROSS-REFERENCE TO RELATED APPLICATION

The present application a national phase application of PCT Application No. PCT/EP2013/056552, filed Mar. 27, 2013, and claims priority to German Application No. DE 10 2012 209 655.8, filed on Jun. 8, 2012, and German Application No. DE 10 2013 200 845.7, filed on Jan. 21, 2013, the entire contents of which are herein incorporated by reference.

BACKGROUND OF THE INVENTION

1. Field of the Invention

The invention, according to the various embodiments described herein, relates to a method and a system for time synchronization in an ad-hoc network.

2. Discussion of the Background

In mobile networks without an infrastructure—so-called ad-hoc networks—the management, monitoring and control of data traffic are processed directly between the individual network participants—the so-called nodes or network nodes.

In this context, one essential function is the time synchronization between all of the nodes in an ad-hoc network. An identical time basis for all of the nodes in the ad-hoc network is an absolute prerequisite for accurate time synchronization of all nodes in the ad-hoc network with the synchronization bit pattern transmitted in a given time window for synchronization with the correct phase and frequency of the transmission signal, for example, within a given time segment of a frequency-hop method used in an ad-hoc network.

A time synchronization in an ad-hoc network is known. In this context, clusters of respectively regionally adjacent nodes are initially formed. An intra-cluster time synchronization is implemented in each individual cluster formed in this manner in that, according to a fixed sequence, individual nodes of the cluster transmit a message for time synchronization with the transmission time of the message at the local time of the transmitting node, by means of which the other nodes of the cluster synchronize their local time with the local time of the transmitting node. The disadvantage with the time synchronization is, on the one hand, the time delay in the implementation of the time synchronization, which results from the time required to form the cluster, and, on the other hand, the cost for implementing the time synchronization, which includes a specification of the sequence for transmitting messages for the time synchronization.

SUMMARY OF THE INVENTION

Embodiments of a method and a system for time synchronization in an ad-hoc network which achieves a time synchronization as fast as possible and with minimum cost with all of the nodes of the ad-hoc network are provided herein.

For this purpose, in one embodiment, each node of an ad-hoc network transmits a message signalling a presence, in each case, within a given time frame, which is acknowledged respectively by network nodes disposed within the reception range of the transmitting node, by transmitting an acknowledgement message. Starting from two nodes each positioned within the transmission range of one another, with regard to the messages of an acknowledgement message, that node is specified by the node receiving the acknowledgement message, with the local time of which the respectively other node synchronizes its local time. The node of which the local time is used for the synchronization of the local time of the respectively other node therefore represents the local master of the respectively other node in the ad-hoc network formed from two nodes.

The two nodes can be nodes, which, in each case do not yet belong to an ad-hoc network and accordingly form a common ad-hoc network through the process of time synchronization. The two nodes can also be nodes which also both belong to a different ad-hoc network respectively. In this case, the ad-hoc networks associated respectively with one of the two nodes are combined, and the nodes associated with the two ad-hoc networks each synchronize their local time with the local time of the specified node. Moreover, the two nodes can be, respectively, one node which does not belong to an ad-hoc network and one node which is associated with an ad-hoc network. In this case, the node without integration in an ad-hoc network may be integrated into the ad-hoc network of the respectively other node, and the individual nodes of the original ad-hoc network synchronize their local time with the local time of the specified node.

In all three cases, that node of the two nodes disposed within the transmission range of which the local time provides respectively the maximum time accuracy, or which is linked to a node in an ad-hoc network of which the local time provides respectively the maximum time accuracy, is preferably specified with the highest priority. This guarantees that all of the nodes in the ad-hoc network now formed are time synchronized with the maximum possible time accuracy relative to one another, and accordingly, an optimum phase and frequency synchronization of all nodes of the ad-hoc network now formed with the phase and respectively the frequency of the transmission signal utilized in the ad-hoc network used is made possible within a time segment of the frequency hop method.

If an ad-hoc network is formed comprising only two nodes of which the local times have an identical time accuracy, that node is preferably specified to provide its local time for the synchronization of the local time of the respectively other node, which first transmits an acknowledgement message in response to a message transmitted to both nodes signalling a presence—typically a "hello message". Accordingly, a node which signals its presence to a potential adjacent node by transmitting a message signalling a presence and seeks to form an ad-hoc network with this potential, adjacent node, the responding adjacent node to be its local time master and synchronizes its local time with the local time of the responding adjacent node. In this manner, the process of determining which of the two nodes will become the local time master is simplified and accordingly accelerated.

If at least one of the two nodes disposed within the transmission range of one another is integrated in an ad-hoc network with at least one other node, and the local times of all nodes in the ad-hoc network now formed have an identical time accuracy, that node of the two nodes disposed within transmission range of one another which is already connected to a relatively larger number of nodes in a previously existing ad-hoc network is preferably specified with the next lower priority as the local time master. The local times of all nodes which are integrated in the ad-hoc network now formed are synchronized directly or indirectly with its local time. Such a specification of a node determines a minimally necessary synchronization cost between the individual nodes of the ad-hoc network now formed.

If the two nodes disposed within transmission range of one another and the nodes previously integrated in an ad-hoc network with these two nodes each have a local time with an identical time accuracy, and the number of nodes integrated respectively in an ad-hoc network with the two nodes disposed within transmission range of one another is identical, that node of the two nodes disposed within transmission range of one another in the connected ad-hoc network of which a node with the lowest identity number is integrated is specified with the lowest priority to act as the local time master. The Medium-Access-Control (MAC) Address of the respective node is preferably selected as the identity number.

If at least one node is completely removed from an existing ad-hoc network, and if the moving node was a local time master in the previous ad-hoc network, that node of the remaining ad-hoc network of which the local time has the maximum time accuracy of the local times of all nodes disposed in the remaining ad-hoc network is preferably specified with the highest priority as the local time master.

If all nodes of the remaining ad-hoc network provide a local time with an identical time accuracy, that node of the remaining ad-hoc network which provides the largest number of respectively directly adjacent nodes after the complete removal of at least one node from the previous ad-hoc network is specified with the next lower priority to act as the local time master.

Finally, if all nodes of the remaining ad-hoc network have a local time with an identical time accuracy and, in each case, have an identical number of directly adjacent nodes, that node of the remaining ad-hoc network which provides the lowest identity number after the complete removal of at least one node from the previous ad-hoc network is preferably specified with the lowest priority as the local time master.

The complete removal of a node from an existing ad-hoc network is preferably identified by the nodes of the remaining ad-hoc network if no further message signalling the presence of the moving node has been received since the last reception time within a constant time frame in which, in each case, a message signalling a presence is transmitted by at least one node of the remaining ad-hoc network.

In one embodiment, a node of a previously existing ad-hoc network, from the transmission range of which a node is removed with the local time of which the node previously synchronized its local time, will generally specify another node of the remaining ad-hoc network disposed within the transmission range in order to synchronize its local time with the local time of the node specified as the local time master. In this context, the node moving from the transmission range of the node can continue to be disposed within the transmission range of at least one further node of the remaining ad-hoc network.

A consideration of the transmission time occurring between the node specified as the local time master and the node implementing the time synchronization preferably takes place on the basis of a comparison of the transmission time with the transmitted reception time of the message signalling a presence or the acknowledgement message. This time synchronization of the local time of the respective node with the local time of the node specified as the local time master takes place not only in the initial contact between these two nodes but in a cyclical manner at every reception time of a message signalling a presence or an acknowledgement message.

In an ad-hoc network which evolves according to the mechanisms described above, since only a single node acts as the local time master for at least one other node, which, in turn, acts as local time master for other nodes in the ad-hoc network, the local time of every node in the ad-hoc network is synchronized with the local time of this single node indirectly, in a successive manner and without its own local time master.

In order to reduce a clock drift of a local time of a node within the ad-hoc network, which has lower time accuracy than the local time of the node specified as the local time master, the constant time frame for the cyclical transmission of messages signalling a presence is preferably minimized by synchronizing nodes. In particular, the transmission time of a message signalling a presence is calculated in advance by the synchronizing node in order to limit the influence of clock drift on the time accuracy of the local time of the synchronizing node to a given value.

BRIEF DESCRIPTION OF THE DRAWINGS

Exemplary embodiments of the method and the system for time synchronization in a mobile ad-hoc network are explained in detail below by way of example on the basis of the drawings. The figures in the drawings show.

Figure 1:
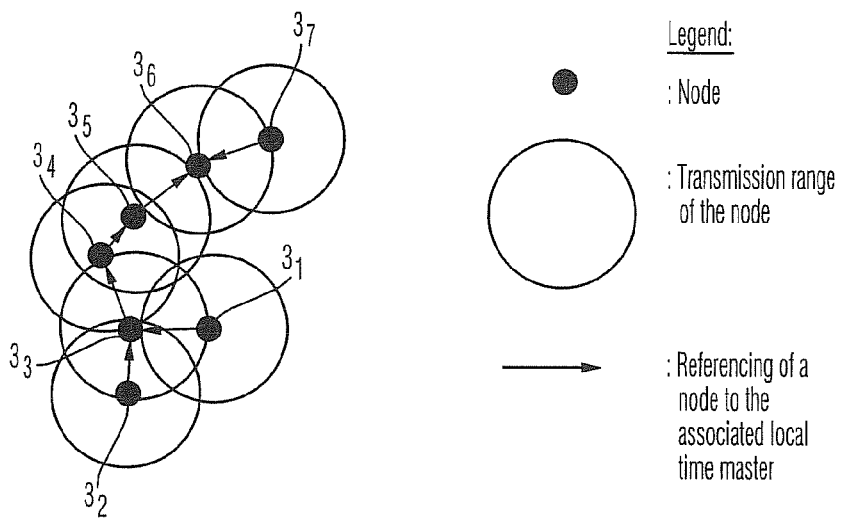
FIG. 1 a presentation of an exemplary embodiment of the system for time synchronization in a mobile ad-hoc network.
Figure 10:
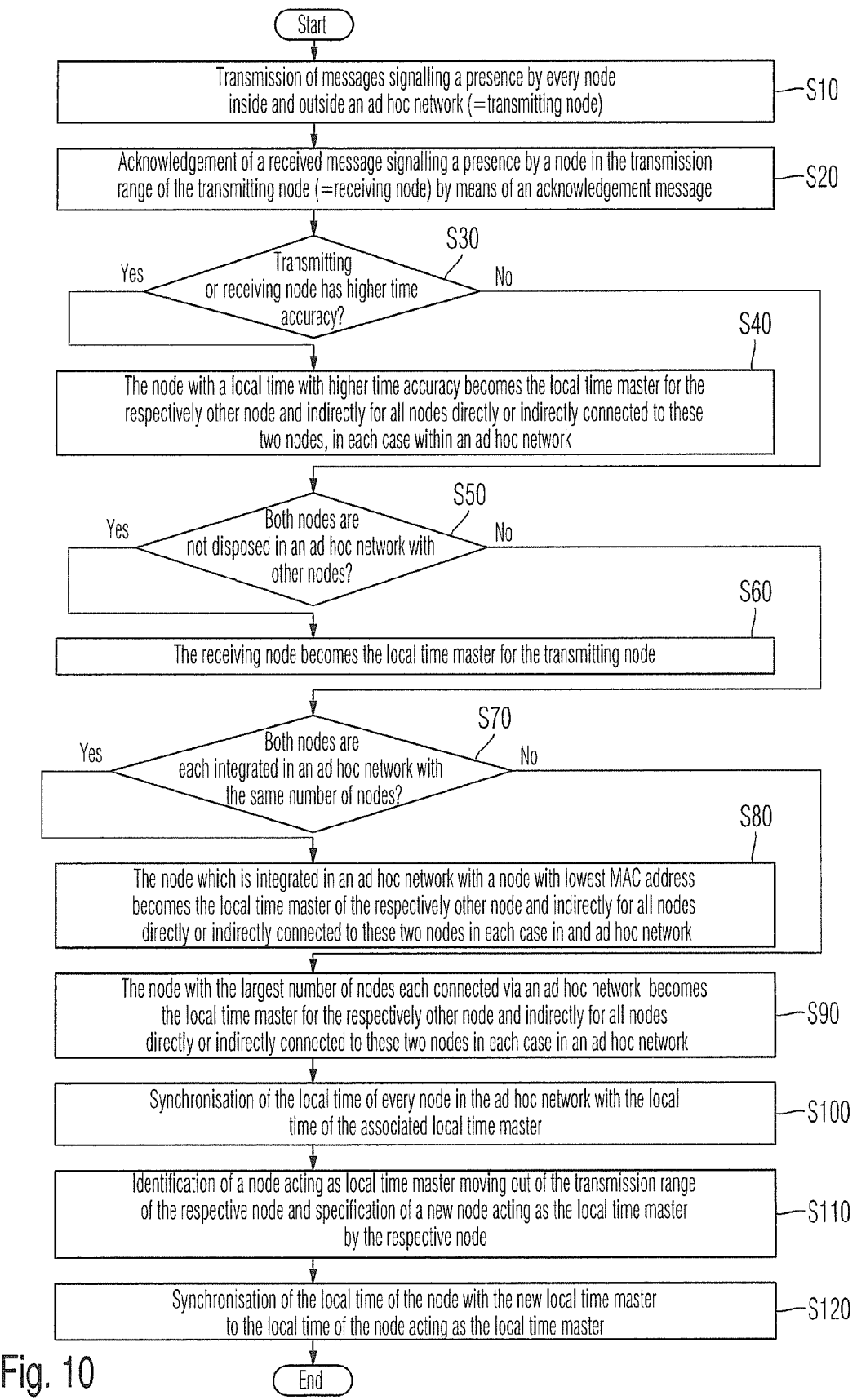
FIG. 10 a flow chart of an exemplary embodiment of the method for time synchronization in a mobile ad-hoc network.

The system for time synchronization in a mobile ad-hoc network is explained in detail in the following section with reference to the illustration shown in FIG. 1, and the method for time synchronization in a mobile ad-hoc network is explained in detail with reference to the flow diagram shown in FIG. 10. In the first method step S10 of the method, every node inside or outside an ad-hoc network continually transmits a message within a given, constant time frame signalling its presence 1, especially a "hello message" ("hello message"), in order to signal its presence to adjacent nodes which are disposed within its transmission range. This constant time frame for the transmission of a message signalling its presence is typically not identical in each node, but, in each case, provides a different value for each node.

The message signalling a presence 1 of the node i typically includes the following contents:
an identity code of the node i, which is typically the Medium-Access-Control (MAC) address of the node i,
the transmission time $TS_i$ of the node i at the local time of the node i,
the adjacent nodes $N(i_1, i_2, i_3, \ldots)$ in the case of identified nodes within the transmission range of the node i,
the reception times $RxTS(i_1, i_2, i_3, \ldots)$ of messages signalling a presence which are disposed within the transmission range of the node i and
the time accuracy of the local time of the node i.

In the following paragraphs, the node transmitting a message signalling a presence 1 is referred to as the transmitting node.

In the next method step S20, the message transmitted by a node i signalling a presence 1 of a node j, which is disposed within the transmission range of the node i and accordingly receives the message signalling a presence 1 of the node i, is acknowledged with an acknowledgement message 2, especially an "I-hello message". This acknowledgement message 2 is transmitted by the node j immediately after the reception of the message signalling a presence 1. To avoid the simultaneous transmission of an acknowledgement message 2 by several nodes which receive the message signalling a presence 1 of the node i at more or less the same time, and therefore to avoid blocking the transmission channel in the ad-hoc network, the transmission of the acknowledgement message 2 is implemented by the individual node in each case delayed by a small delay time, which varies from node to node, by comparison with the reception time of the message signalling a presence 1.

An acknowledgement message 2 includes the same contents as a message signalling a presence 1. The node receiving a message signalling a presence 1 and transmitting an acknowledgement message 2 is referred to in the following paragraphs as the receiving node.

Alongside the nodes each transmitting a message signalling a presence 1 or each transmitting an acknowledgement message 2 which already belong to an ad-hoc network and are accordingly time synchronized with all of the nodes of the ad-hoc network, there are also nodes which each transmit a message signalling a presence 1 or each transmit an acknowledgement message 2 in response to receiving a message signalling a presence 1 but which do not yet belong to an ad-hoc network. For such nodes which are searching for an ad-hoc network, the possibility is offered to form an ad-hoc network with this other node upon receiving a message signalling a presence 1 or an acknowledgement message 2 from another node. If the respectively other node is itself not yet disposed in an ad-hoc network, a new formation of an ad-hoc network takes place between these two nodes. If the respectively other node is already integrated in an ad-hoc network, the node which is searching for an ad-hoc network is accepted into the existing ad-hoc network of the respectively other node. Finally, the two nodes which enter into contact with one another via the transmission and the reception of a message signalling a presence 1 or an acknowledgement message 2 can each belong to a different ad-hoc network. As a result of these two nodes taking up contact, a combination of the two ad-hoc networks to form a single combined ad-hoc network can be achieved.

In order to realize a time synchronization between the two nodes in the ad-hoc network to be formed or to realize a time synchronization between all of the nodes in the expanded ad-hoc network, a node disposed in the direct neighbourhood which represents a local master for the respectively other nodes and with the local time of which the respectively other node synchronizes its local time is specified for every node of the ad-hoc network to be formed or to be expanded. Since every node in the now existing ad-hoc network synchronizes its local time with the local time of the associated local time master, all of the nodes of the now existing ad-hoc network are time synchronized with one another. FIG. 1, which represents the exemplary embodiment of the system for time synchronization in a mobile ad-hoc network, shows individual nodes 31, 32, 33, 34, 35, 36 and 37 which are each positioned within transmission range of one another and accordingly form an ad-hoc network. The local time master specified for each individual one of these nodes 31, 32, 33, 34, 35, 36 and 37 is evident here from the direction of the arrow of the connecting straight line in each case between two adjacent nodes.

The specification of the local time master associated with each node within the now existing ad-hoc network is implemented via a priority hierarchy.

The node of the existing ad-hoc network which, in each case, provides the local time with the maximum time accuracy is identified with the highest priority and is therefore specified as the local time master. According to the next method step S30, it is determined whether, in each case, the time accuracy of the local time of the two nodes—transmitting node or receiving node—contained in the transmitted message signalling a presence 1 or in the transmitted acknowledgement message 2 provides a higher value.

In the next method step S40, if the transmitting node or the receiving node provides higher time accuracy in its local time, that node which provides the relatively higher time accuracy in its local time becomes the local time master of the respectively other node. Because of the time referencing of every node with a directly adjacent node within an ad-hoc network according to FIG. 1, all of the nodes which are already connected in an ad-hoc network to the transmitting or receiving node which references its local time to the local time of the receiving or transmitting node acting as the local time master synchronize their local time indirectly with the local time of this local time master. The nodes which are already connected within an ad-hoc network to the node acting as the local time master remain unchanged in their time referencing relative to a respectively adjacent node acting as the local time master.

In the next method step S50, if the local times of the transmitting and receiving node each provide an identical time accuracy, it is determined with the next lower priority, whether, in each case, the two nodes entering into contact with one another—transmitting node and receiving node—are nodes without integration in an existing ad-hoc network, or respectively whether one of the two nodes or both nodes are already integrated in an ad-hoc network.

According to the next method step S60, if both the transmitting node and respectively also the receiving node are not yet integrated in an ad-hoc network, the node receiving a message signalling a presence 1 is specified as the local time master of the node transmitting a message signalling a presence 1.

In a subsequent method step S70, if at least one node is already integrated in an ad-hoc network, it is determined whether both nodes are each integrated in an ad-hoc network with an identical number of nodes. In the next method step S80, if this is the case, that node of the two nodes entering into contact with one another which has so far been integrated in an ad-hoc network with a node which provides the lowest Medium-Access-Control (MAC) address is specified as the local time master. This node becomes the local time master not only for the respectively other node of the two nodes entering into contact, but acts indirectly as the local time master for all nodes which are integrated with the respectively other nodes in an ad-hoc network, because of the successive time referencing between every node of the ad-hoc network and its associated, adjacent node acting as the local time master.

If both of the nodes entering respectively into contact with one another are already integrated in an ad-hoc network with a different number of nodes in each case, or if one node is not integrated in an ad-hoc network at all, while the respectively other node is already associated with an ad-hoc network, according to the next method step S90, that node of the two nodes entering into contact with one another which is integrated in the ad-hoc network with the largest number of nodes becomes the local time master of the respectively other node. The nodes which are disposed in an ad-hoc network with the node of the two nodes entering into contact with one another which has not been specified as the local time master also synchronize their local time indirectly with the local time of this node specified as the local time master because of the successive time referencing between every node of the ad-hoc network and its associated adjacent node acting as the local time master.

In the next method step S100, every node in the resulting ad-hoc network synchronizes its local time with the local time of its associated local time master. For this purpose, the respective node uses the time information which is contained in a message signalling a presence 1 or an acknowledgement message 2 currently received from the associated node acting as the local time master. This relates, on the one hand, to the transmission time of the respective message signalling a presence 1 or the respective acknowledgement message 2 determined at the local time of the node acting as the local time master, and also to the reception time of the message signalling a presence 1 or acknowledgement message 2 last transmitted from the respective node by the node acting as the local time master.

The node synchronizing its local time with the local time of the respective local time master synchronizes its local time by determining the synchronization of its local time with the local time of the node acting as the local time master and also the determination of the transmission time between the synchronizing node and the node acting as the local time master, on the one hand, from the transmission time determined at the local time of the synchronizing node and the reception time of the respective message signalling a presence 1 or the respective acknowledgement message 2 determined at the local time of the node acting as the local time master and, on the other hand, from the reception time determined at the local time of the synchronizing node and the transmission time of the subsequent acknowledgement message 2 or the message signalling a presence 1 determined at the local time of the node acting as the local time master.

In the subsequent method step S110, a removal, which may occur under some circumstances, of one node or of several nodes from the existing ad-hoc network is identified. For this purpose, a check is carried out by every node of the ad-hoc network to determine whether a further message signalling a presence 1 of the respective adjacent node is received from every adjacent node positioned within the transmission range of the respective node, in each case, within a fixed time interval since the last reception time of a message signalling a presence 1 of the respective adjacent node. If this is the case, the respective adjacent node is still disposed within the transmission range of the checking node. However, if the respective node does not receive a further message signalling a presence 1 of the respective adjacent node within the fixed time interval, the respective adjacent node has moved at least out of the transmission range of the node checking, and, under some circumstances, even out of the transmission range of the combined ad-hoc network. If the node which has moved out of the transmission range of the node checking is a local time master for the checking node, the checking node must search for a new node to act as the local time master. Under some circumstances, the checking node may, in the meantime, also be disposed outside the ad-hoc network, because of the removal of the node acting as the local time master from the transmission range of the checking node.

Without time reference to a node acting as a local time master, the respective node is compelled to search for a new node to act as the local time master. If the respective node still continues to be disposed within the transmission range of another node without a time reference and accordingly within an ad-hoc network with the other node, it can select this other node as its local time master. However, if the respective node without time reference is no longer disposed in the transmission range of another node and is accordingly also no longer in an ad-hoc network with one or more nodes, then it is compelled to take up contact with another node with or without linked ad-hoc network according to method steps S10 to S90 described above.

In the final method step S120, by analogy with method step S100, a v of the local time of the node which has established contact with a node with or without linked ad-hoc network and specified this node to be its local time master takes place at the local time of node specified as the local time master.

In the following section, the exemplary embodiment of the method for time synchronization in a mobile ad-hoc network as just described will be described in greater detail on the basis of the scenarios illustrated in FIGS. 2 to 8 respectively.

Figure 2:
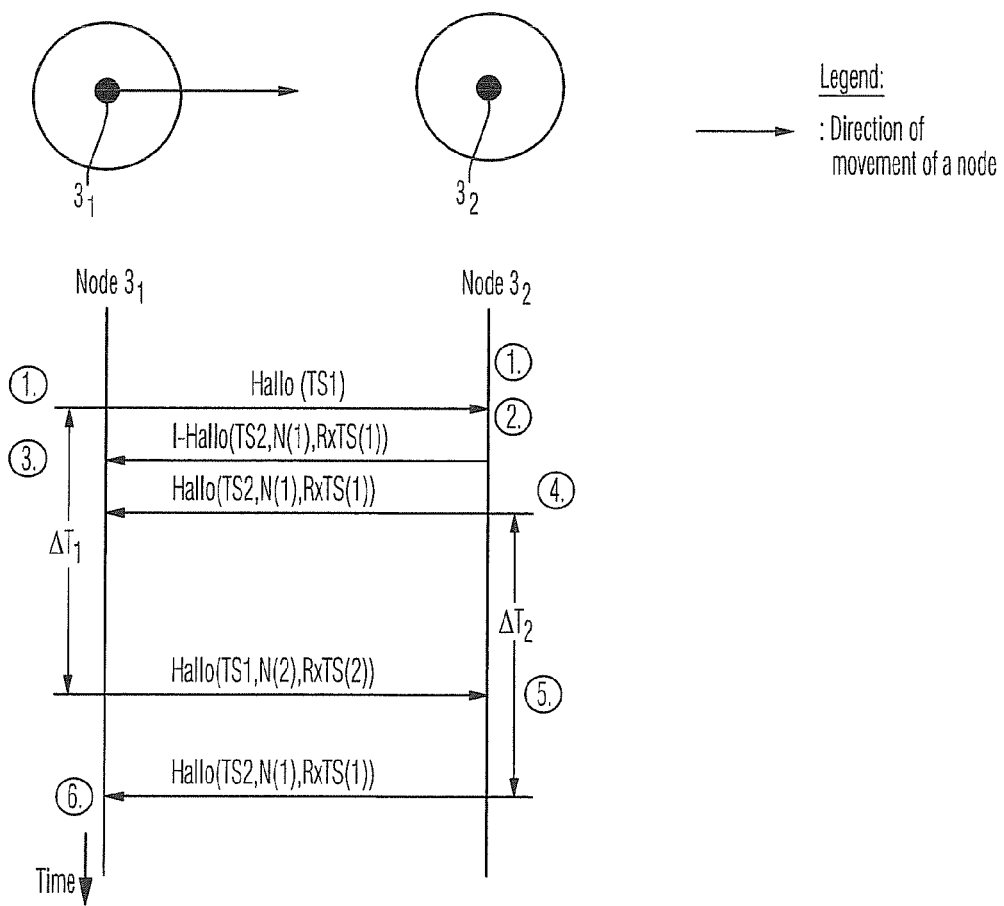
FIG. 2 an exemplary presentation of a first scenario for an ad-hoc network and a time diagram of the messages transmitted between the participating nodes.

In the first scenario in FIG. 2, two nodes without a linked ad-hoc network which are moving towards one another and positioned, from a given time, within the transmission range of one another are considered.

At time (1) at which node $3_1$ transmits a message signalling a presence 1, the two nodes $3_1$ and $3_2$ do not recognize the presence of the respectively other node. Node $3_1$ consequently transmits a "hello message", which contains only the identity of node $3_1$, the transmission time $TS_1$ of the "hello message" transmitted by node $3_1$ at the local time of node $3_1$, the time accuracy of the local time of node $3_1$ and the MAC address of node $3_1$.

This "hello message" of node $3_1$ is received at time (2) by node $3_2$ and immediately acknowledged with an acknowledgement message 2 in the form of an "I-hello message" which, alongside the identity of node $3_2$, the time accuracy of the local time of node $3_2$ and the MAC address of node $3_2$, contains the transmission time $TS_2$ of the "I-hello message" of node $3_2$ at the local time of node $3_2$, the identified adjacent node $3_1$ and the reception time RxTS(1) of the "hello message" of node $3_1$. For node $3_2$, node $3_1$ acts as the local time master at time (2), because node $3_2$ can synchronize its local time, at least roughly—without taking into consideration the transmission time of the "hello message" transmitted by node $3_1$ between node $3_1$ and node $3_2$—with the local time of node $3_1$, by matching its local time, by the difference between the reception time of the "hello message" from node $3_1$ determined at its local time and the transmission time of the "hello message" from node $3_1$ determined at the local time of node $3_1$, to the local time of node $3_1$ acting as the local time master. At time (2), there exists for node $3_2$ only the knowledge that a functioning transmission connection from node $3_1$ to node $3_2$ exists. Accordingly, at time (2) only an asymmetric transmission connection between node $3_1$ and node $3_2$ is present.

At time (3), the "I-hello message" of node $3_2$ is received by node $3_1$. At time (3), there exists for node $3_1$ only the knowledge that a functioning transmission connection from node $3_1$ to node $3_2$ and from node $3_2$ to node $3_1$ exists. Accordingly, at time (2) also, only an asymmetric transmission connection is present between node $3_1$ and node $3_2$. At time (3) node $3_1$ will specify node $3_2$ as its local time master, because the time accuracy of node $3_2$ corresponds to the time accuracy of node $3_i$, and node $3_i$ learns via the "I-hello message" from node $3_2$ that node $3_2$ does not possess an adjacent node within its transmission range and is therefore not integrated in an ad-hoc network. Accordingly, since node $3_1$ and node $3_2$ provide an identical number of respectively adjacent nodes—namely, precisely one single adjacent node, node $3_1$ recognizes that node $3_2$ has become its local time master, because it was that node, which first transmitted a "hello message". Node $3_1$ will synchronize its local time to the local time of node $3_2$ acting as its local time master, and in this context, by contrast with the rough synchronization of node $3_2$, this will achieve an exact synchronization taking into consideration the transmission time between node $3_1$ and node $3_2$.

It is evident from FIG. 2 that, within its cyclical time frame, node $3_2$ transmits a "hello message" at time (4) immediately after transmitting an "I-hello message". In order to avoid unnecessarily overloading the transmission capacity of the transmission channel by transmitting "hello messages" and "I-hello messages", the transmission of a "hello message", which is conventionally implemented within a fixed time interval after the transmission of an "I-hello message", can be suppressed.

A further "hello message" transmitted within the cyclical time frame $\Delta T_1$ by node $3_1$, in which, by contrast with the first "hello message" of node $3_1$, node $3_2$, which has been identified as the adjacent node N(2), and the reception time RxTS(2) of the "hello message" transmitted by the identified adjacent node $3_2$ are transmitted at the local time of node $3_1$, is received by node $3_2$ at time (5). From time (5), a symmetrical transmission connection is present between node $3_1$ and node $3_2$, since node $3_1$ and also node $3_2$ have both recognized that a functioning transmission connection exists from node $3_1$ to node $3_2$ and from node $3_2$ to node $3_1$.

A further "hello message" transmitted in the cyclical time frame $\Delta T_2$ by node $3_2$ is received at time (6) by node $3_1$. At time (6), a new cyclical synchronization by node $3_1$ of its local time with the local time of node $3_2$ acting as the local time master for node $3_1$ is implemented.

Figure 3:
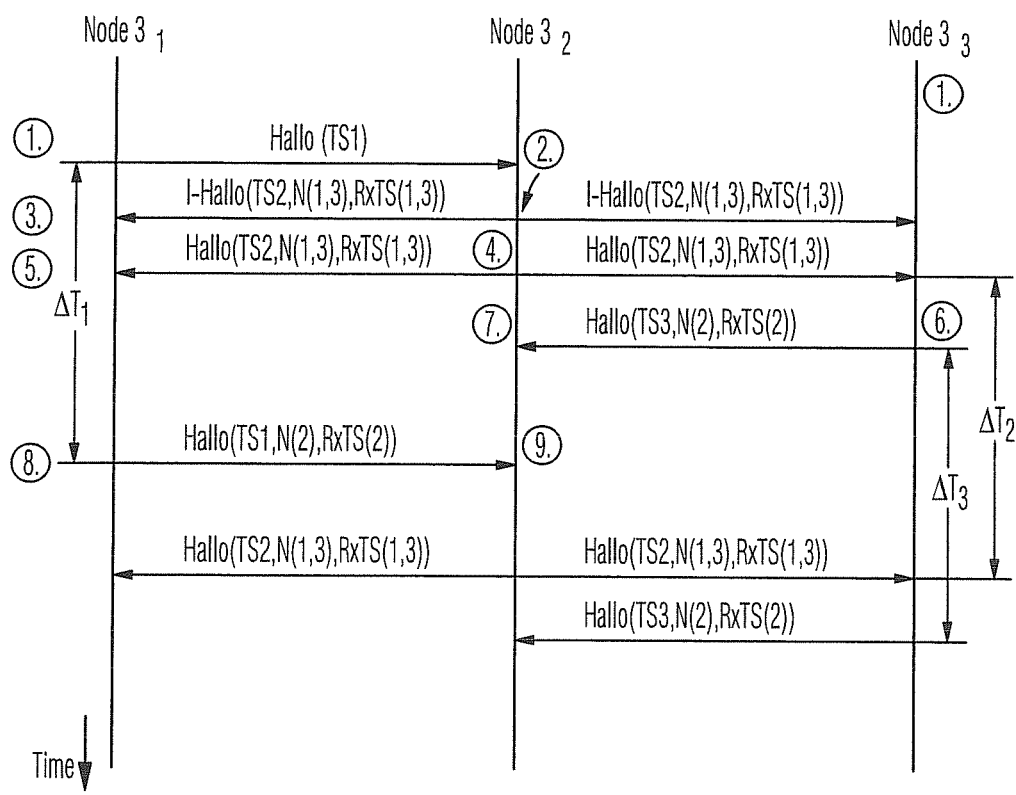
FIG. 3 an exemplary presentation of a second scenario for an ad-hoc network and a time diagram of the messages transmitted between the participating nodes.

In the second scenario in FIG. 3, a node $3_1$ approaches a node $3_2$ which is positioned in the transmission range of a node $3_3$ and therefore already forms an ad-hoc network with this node $3_3$.

At time (1), node $3_1$, which does not form an ad-hoc network with any other node, transmits a "hello message". This "hello message" is received at time (2) by node $3_2$ positioned within the transmission range of node $3_1$. While a symmetrical transmission connection exists for node $3_2$ at time (2) relative to node $3_2$ because of the common ad-hoc network already existing for a relatively long time, only an asymmetrical transmission connection exists between node $3_2$ and node $3_1$ because only node $3_2$ recognizes that a correct transmission from node $3_1$ to node $3_2$ is realized. At time (2), node $3_3$ disposed in the common ad-hoc network is specified by node $3_2$ as its local time master.

The "hello message" received by node $3_2$ at time (2) is acknowledged by node $3_2$ with an "I-hello message", which, alongside the identity of node $3_2$, the time accuracy of the local time of node $3_2$ and the MAC address of node $3_2$, contains the adjacent nodes $3_1$ and $3_3$ known to node $3_2$ at time (2) and the reception times RxTS(1, 3) of the "hello message" just received from node $3_1$ and the last "hello message" received in the cyclical time frame $\Delta T_3$ from node $3_3$.

At time (3), the "I-hello message" of node $3_2$ is received by node $3_1$ and node $3_3$. At time (3), node $3_1$ recognizes that node $3_2$ has become its local time master, since node $3_1$ learns via the "I-hello message" of node $3_2$ that node $3_2$ is disposed in an ad-hoc network with node $3_3$, and accordingly, node $3_2$ provides a larger number of adjacent nodes in its ad-hoc network than node $3_1$. At time (3), the transmission connection between node $3_1$ and node $3_2$ continues to be asymmetric, because only node $3_1$ recognizes that the transmission from node $3_1$ to node $3_2$ and from node $3_2$ to node $3_1$ is functioning correctly.

At time (4), node $3_2$ transmits within its cyclical time frame $\Delta T_2$ a further "hello message", which node $3_1$ receives at time (5). Node $3_1$ synchronizes its local time at time (5) with the local time of its local time master, node $3_2$, from the time information which is contained in the "hello message" of node $3_2$.

Within its cyclical time frame $\Delta T_3$ at time (6), node $3_3$ transmits a "hello message" which is received by node $3_2$ at time (7). Since node $3_3$ represents the local time master of node $3_2$, node $3_2$ synchronizes its local time with the local time of the node $3_3$ in a repeated cyclical manner at time (7) using the time information transmitted in the "hello message" of the node $3_3$.

A "hello message" transmitted by node $3_1$ within its cyclical time frame $\Delta T_1$ at time (8) in which the information N(2) about the identified adjacent node $3_2$ and the reception time RxTS(2) of the "hello message" transmitted by node $3_2$ is contained is received by node $3_2$ at time (9). From time (9), a symmetrical transmission connection is present between node $3_1$ and node $3_2$, since node $3_1$ and also node $3_2$ have both recognized the correct transmission from node $3_1$ to node $3_2$ and from node $3_2$ to node $3_1$.

Figure 4:
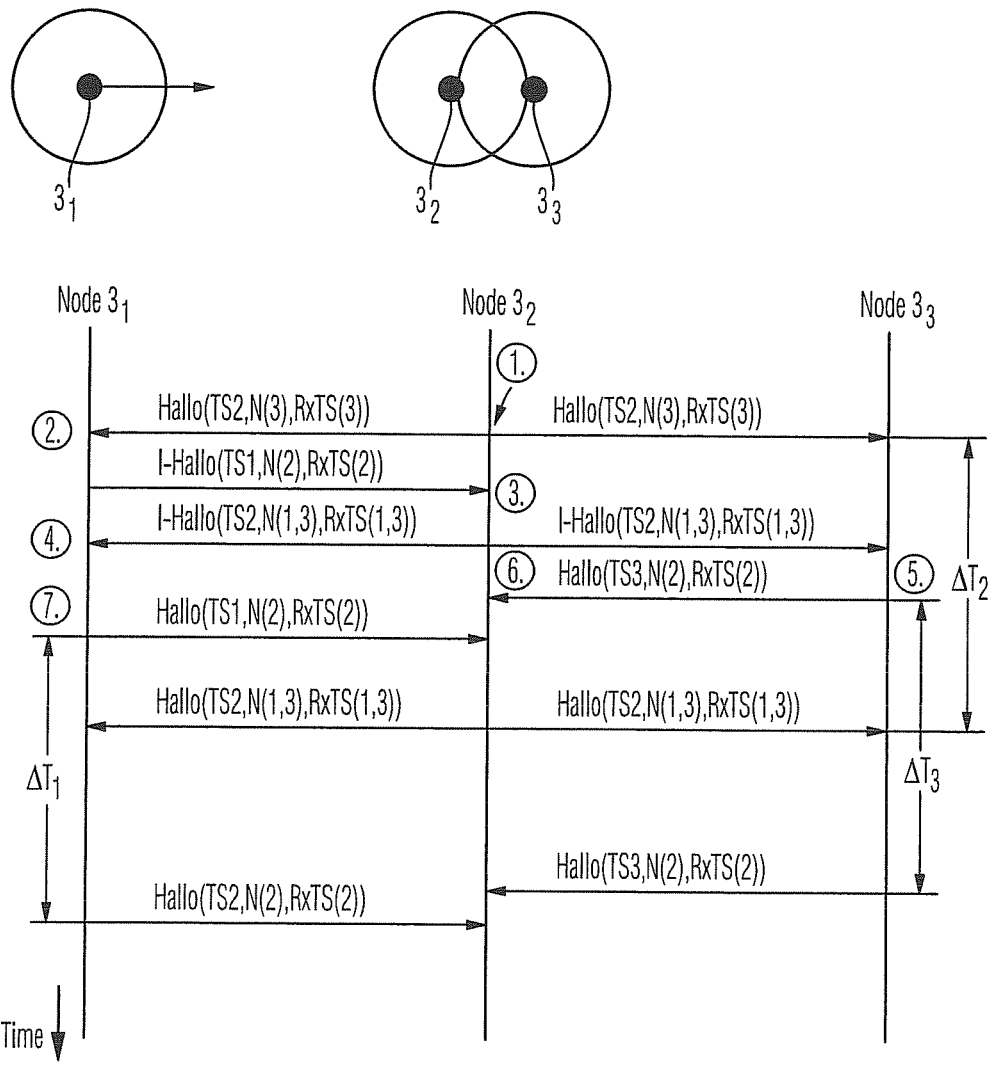
FIG. 4 an exemplary presentation of a third scenario for an ad-hoc network and a time diagram of the messages transmitted between the participating nodes.

In the third scenario in FIG. 4, a node $3_1$ also approaches a node $3_2$ which is positioned in the transmission range of a node $3_3$ and accordingly forms an ad-hoc network with node $3_3$.

At time (1), node $3_2$ transmits within its cyclical time frame $\Delta T_2$ a "hello message" which contains, alongside its identity, the time accuracy of its local time and its MAC address, the information N(3) about the known adjacent node $3_3$ and the reception time RxTS(3) of the last received "hello message" of the adjacent node $3_3$. This "hello message" of node $3_2$ is received at time (2) by node $3_1$. Since node $3_1$ learns in this "hello message" from node $3_2$ that node $3_2$ forms an ad-hoc network with node $3_3$, node $3_1$ will specify its adjacent node $3_2$ as its local time master. A synchronization of the local time of node $3_1$ at time (2) with the local time of the adjacent node $3_2$ is not yet possible, since a time information for determining the transmission time between node $3_1$ and node $3_2$ is not yet available.

Node $3_1$ will acknowledge the "hello message" of node $3_2$ immediately after its reception with an "I-hello message" in which it communicates to node $3_2$ its identity, the transmission time $TS_1$ of the "I-hello message" at the local time of node $3_1$, the identified identity N(2) of the adjacent node $3_2$ and the reception time RxTS(2) of the "hello message" of the adjacent node $3_2$. This "I-hello message" of node $3_1$ is received by node $3_2$ at time (3). The identification of the adjacent node $3_1$ upon reception of the "I-hello message" by node $3_2$ is acknowledged with a further "I-hello message" of node $3_2$, in which the identified identity N(1, 3) of the two adjacent nodes $3_1$ and $3_3$ and the reception times RxTS(1, 3) of the "I-hello message" received from node $3_1$ and the "hello message" received from node $3_3$ are contained alongside other information.

This "I-hello message" of node $3_2$ is received at time (4) by node $3_1$ which synchronized its local time from the time information of this "I-hello message" with the local time of node $3_2$ acting as the local time master. From time (4), a symmetrical transmission connection exists between node $3_1$ and node $3_2$, since nodes $3_1$ and also node $3_2$ have both recognized the correct transmission from node $3_1$ to node $3_2$ and from node $3_2$ to node $3_1$.

A "hello message" transmitted by node $3_3$ at time (5) within its cyclical time frame $\Delta T_3$ is received by node $3_2$ at time (6) and used for synchronizing the local time of node $3_2$ with the local time of node $3_3$ acting as the associated local time master.

From time (7), node $3_1$ transmits a "hello message", in each case, within its cyclical time frame $\Delta T_1$.

Figure 5:
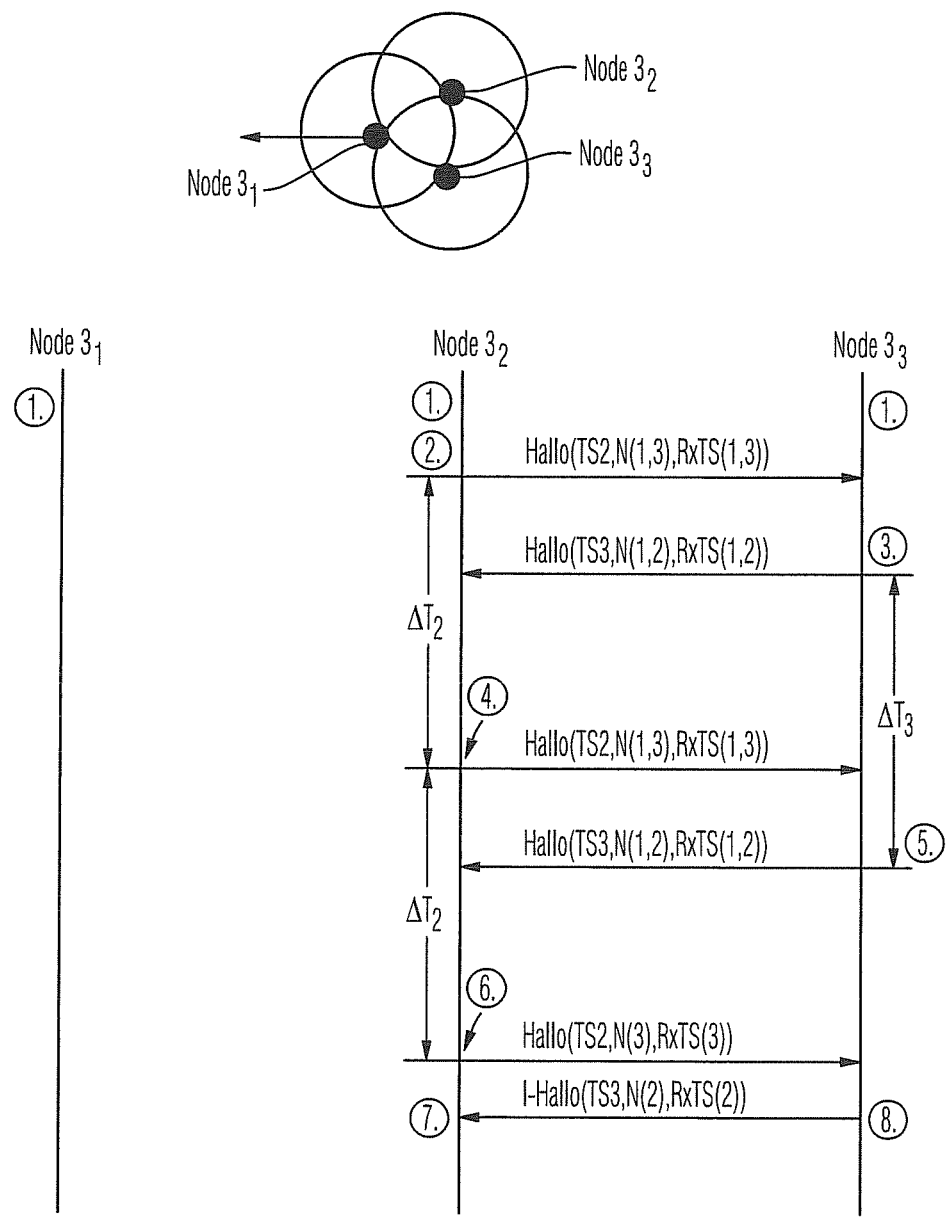
FIG. 5 an exemplary presentation of a fourth scenario for an ad-hoc network and a time diagram of the messages transmitted between the participating nodes.

In the fourth scenario in FIG. 5, a node $3_1$ moves from an ad-hoc network which originally consists of the nodes $3_1$, $3_2$ and $3_3$.

At time (1), a symmetrical transmission connection exists in each case between node $3_1$ and node $3_2$, also between node $3_2$ and node $3_3$ and also between node $3_1$ and node $3_3$, since each of the nodes $3_1$, $3_2$ and $3_3$ has recognized respectively the correctness of a bidirectional transmission to each of the other two nodes. Node $3_1$ represents the local time master for both of the other nodes $3_2$ and $3_3$ because it has the lowest MAC address.

At both of the first times (1) and (4) of the cyclical time frame $\Delta T_2$ respectively, node $3_2$ transmits a "hello message" which is received only by node $3_3$, because node $3_1$ has moved out of the transmission range of node $3_2$. At both times (1) and (4), node $3_2$ does not yet recognize the removal of node $3_1$ from the common ad-hoc network and therefore also transmits the identified identity N(1, 3) of the two adjacent nodes $3_1$ and $3_3$ in the common ad-hoc network and the reception times RxTS(1, 3) of the last received "hello messages" of the two adjacent nodes $3_1$ and $3_3$ in its "hello message", along with other information.

Node $3_3$ also does not yet recognizes the removal of node $3_1$ from the common ad-hoc network at the transmission times (3) and (5) of the "hello message" transmitted in the cyclical time frame $\Delta T_3$ and therefore also transmits the identified identity N(1, 2) of the two adjacent nodes $3_1$ and $3_2$ in the common ad-hoc network and the reception times RxTS(1, 2) of the last received "hello messages" of the two adjacent nodes $3_1$ and $3_2$ in its "hello message" along with other information.

Node $3_2$ only recognizes the removal of node $3_1$ from its transmission range at transmission time (6) and therefore only transmits the identified identity N(3) of the adjacent node $3_3$ and the reception time RxTs(3) of the "hello message" last received from node $3_3$ in its "hello message" along with other information. The information contained in the "hello message" from node $3_2$ that node $3_1$ has moved out of the transmission range of node $3_2$ is acknowledged by node $3_2$ with an "I-hello message" immediately after the reception of the "hello message" from node $3_2$.

At the reception time (7) by node $3_2$ of the "I-hello message" transmitted from node $3_3$, node $3_3$ becomes the new local time master of node $3_2$. Node $3_2$ synchronizes its local time at the time (7) with the local time of the node $3_3$ using the time information of the "I-hello message" of node $3_3$.

From a given time (8), node $3_3$ recognizes that node $3_1$ has moved out of its transmission range and infers from this that, with immediate effect, it has itself become the local time master for node $3_2$ and, accordingly, no longer need synchronize its own local time with the local time of another node of the ad-hoc network.

Figure 6:
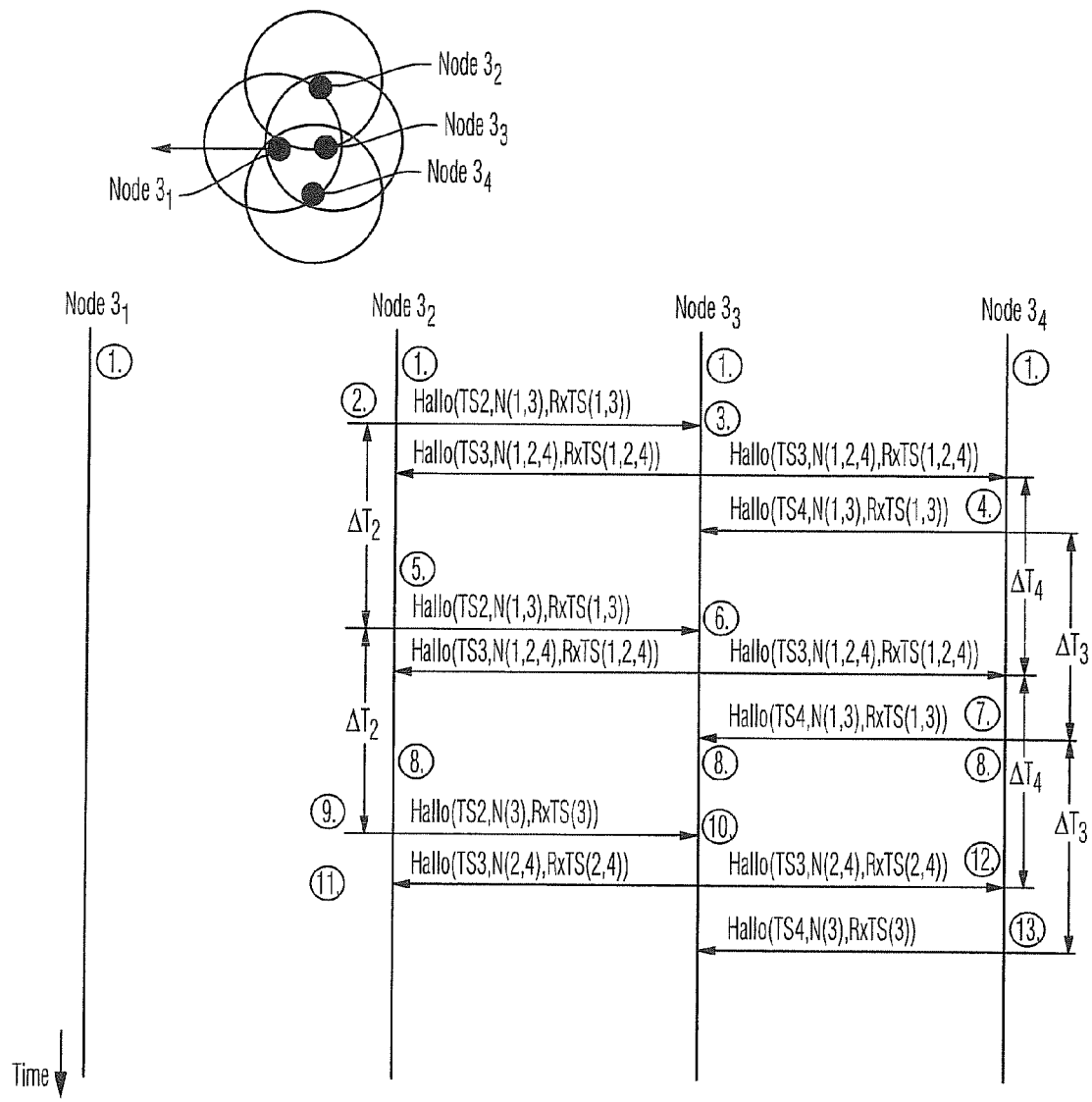
FIG. 6 an exemplary presentation of a fifth scenario for an ad-hoc network and a time diagram of the messages transmitted between the participating nodes.

In the fifth scenario in FIG. 6, a node $3_1$ moves out of a common ad-hoc network which was originally formed from the nodes $3_1$, $3_2$, $3_3$ and $3_4$.

In the configuration of the fifth scenario at time (1), a symmetrical transmission connection of node $3_1$ to the two nodes $3_2$ and $3_3$ exists, a symmetrical transmission connection of node $3_2$ to the two nodes $3_1$ and $3_3$ exists, a symmetrical transmission connection of the node $3_3$ to the nodes $3_1$, $3_2$ and $3_4$ exists, and a symmetrical transmission connection of the node $3_4$ to the two nodes $3_1$ and $3_2$ exists. Node $3_3$ acts as the local time master for the nodes $3_1$, $3_2$ and $3_4$, since it represents the only node in the common ad-hoc network with the largest number of adjacent nodes.

The removal of node $3_1$ out of the transmission range of node $3_2$ at the transmission times (2) and (5) of the "hello message" from node $3_2$ has not yet been recognized, so that this "hello message" from node $3_2$ contains information on all of the adjacent nodes $3_1$ and $3_3$ of node $3_2$. In an equivalent manner, the removal of node $3_1$ from the transmission range of node $3_3$ has not yet been recognized at the transmission times (3), and (6) of the "hello message" from node $3_3$, so that the "hello message" from node $3_3$ contains the information on all of the adjacent nodes $3_1$, $3_2$ and $3_4$ of node $3_3$. Finally, the removal of node $3_1$ from the transmission range of node $3_4$ has not yet been recognized at transmission times (4) and (7) of the "hello message" from node $3_4$, so that the "hello message" from node $3_4$ also contains information about two adjacent nodes $3_1$ and $3_3$ of the node $3_4$.

More or less at the same time as time (8), nodes $3_2$, $3_3$ and $3_4$ recognize the removal of node $3_1$ from their respective transmission ranges and accordingly also from the overall ad-hoc network as a result of the absence of a "hello message" from node $3_1$.

Accordingly, at transmission time (9), the "hello message" from node $3_2$ contains only information for the remaining adjacent node $3_3$. Similarly, at transmission time (10), the "hello message" from node $3_3$ contains only information for the remaining adjacent nodes $3_2$ and $3_4$. Finally, at transmission time (13), the "hello message" from node $3_4$ contains only information for the remaining adjacent node $3_3$. An acknowledgement of the information contained in the "hello message" from node $3_2$ that node $3_1$ has moved out of the transmission range of node $3_2$, through an immediately transmitted "I-hello message" by node $3_3$, is absent, since node $3_3$ transmits a "hello message" comparatively close in time to the transmission time (10) from which it is evident that node $3_1$ has also moved out of the transmission range of node $3_3$. For the same reason, node $3_4$ does not transmit an acknowledgement by means of an "I-hello message" of the information contained in the "hello message" from node $3_3$ that node $3_1$ has moved out of the transmission range of node $3_3$.

Node $3_3$ becomes the local time master for nodes $3_2$ and $3_4$ of the remaining ad-hoc network, since it is the only node in the remaining ad-hoc network with the largest number of adjacent nodes. Accordingly, at the reception time (11) of the "hello message" of node $3_3$, node $3_2$ synchronizes its local time with the local time of node $3_3$ acting as local time master, while, at the reception time (12) of the "hello message" of the node $3_3$, node $3_4$ synchronizes its local time in an equivalent manner with the local time of node $3_3$.

Figure 7:
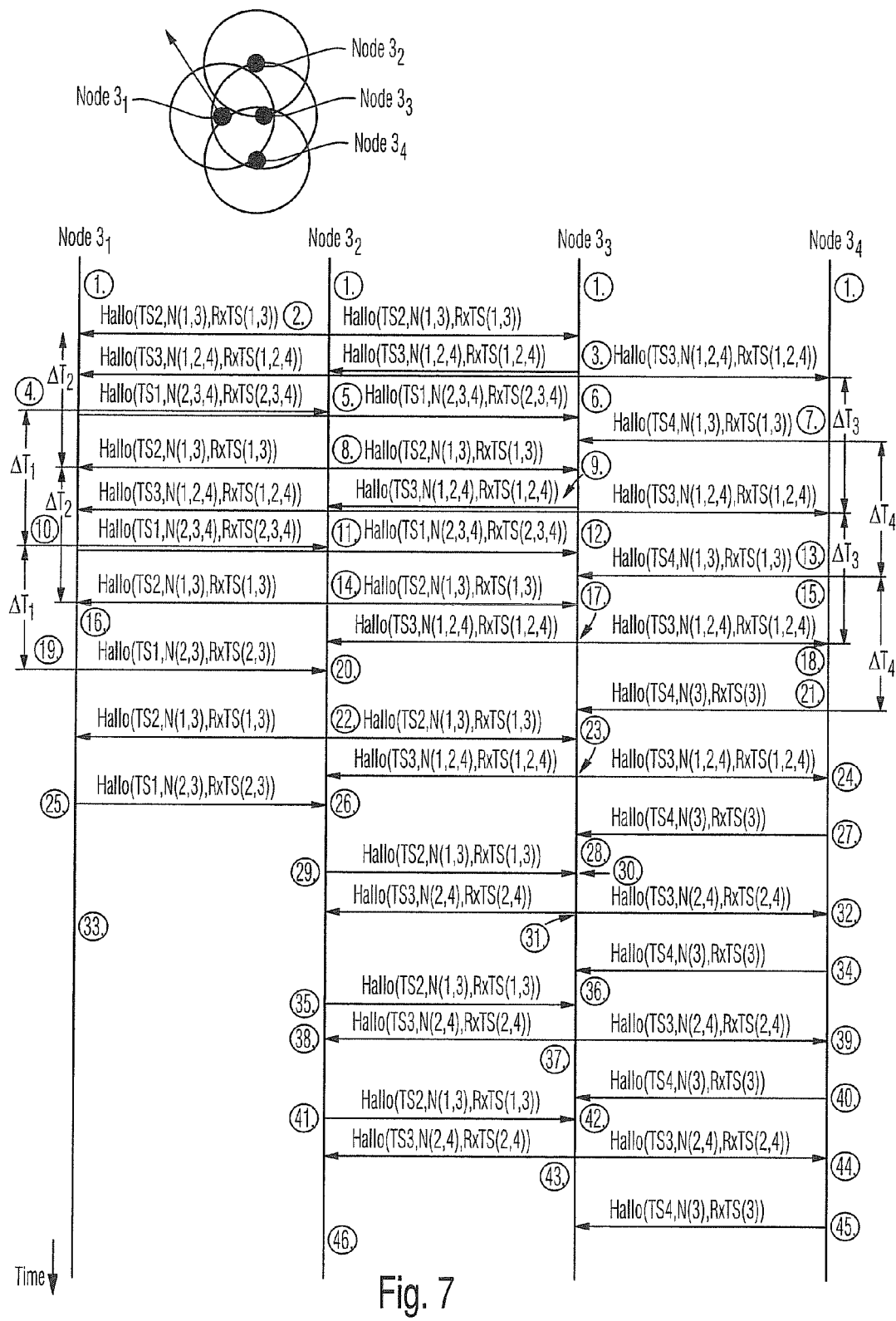
FIG. 7 an exemplary presentation of a sixth scenario for an ad-hoc network and a time diagram of the messages transmitted between the participating nodes.

In the sixth scenario in FIG. 7, node $3_1$ does not move away from all of the other nodes $3_2$, $3_3$ and $3_4$ of the remaining ad-hoc network at the same time, but moves successively out of the transmission range of the individual nodes $3_4$, $3_3$ and $3_2$. The original configuration of the sixth scenario corresponds to the original configuration of the fifth scenario. Accordingly, node $3_3$ functions as the local time master for nodes $3_1$, $3_2$ and $3_4$, and the existing symmetrical transmission connections between the individual nodes correspond to the symmetrical transmission connections in the fifth scenario. At time (1), node $3_1$ moves out of the transmission range of node $3_4$.

The successive removal of node $3_1$ from the common ad-hoc network is not recognized by the other nodes $3_2$, $3_3$ and $3_4$ at the initial transmission times of their "hello messages". In each case, at transmission times (2), (8), (14), (22), (29), (35) and (41), node $3_2$ transmits a "hello message" with information about all of its adjacent nodes $3_1$ and $3_3$. At transmission times (3), (9), (17) and (23), node $3_3$ transmits a "hello message" with information about all of its adjacent nodes $3_1$, $3_2$ and $3_3$. At transmission times (7) and (13), node $3_4$ transmits a "hello message" with information about all of its adjacent nodes $3_1$ and $3_3$. Because of the removal of node $3_1$ from the transmission range of node $3_4$, the "hello message" transmitted respectively by node $3_1$ and node $3_4$ does not reach nodes $3_4$ and respectively $3_1$.

Node $3_2$ synchronizes its local time with the local time of node $3_1$ at the reception times (5), (11), (20) and (26) of the "hello message" of node $3_1$ using the time information contained in this "hello message". In an equivalent manner, node $3_3$ synchronizes its local time with the local time of node $3_1$ at the reception times (6) and (12) of the "hello message" of node $3_1$ using the time information contained in this "hello message".

At time (15), node $3_4$ recognizes the removal of node $3_1$ from its transmission range, because it has recently not received a "hello message" of node $3_1$ within a specified time interval and, at the next transmission times (21), (27), (34), (40) and (45), it transmits a "hello message" which contains only information about its remaining adjacent node $3_3$. For the synchronization of its local time, it selects node $3_3$ positioned within its transmission range to be its local time master and synchronizes its local time with the local time of node $3_3$ acting as the local time master at the reception times (18), (24), (32), (39) and (44) of a "hello message" of node $3_3$. At time (16), node $3_1$ also moves out of the transmission range of node $3_3$.

At the transmission time (19) of a "hello message" to be transmitted in a cyclical manner, node $3_1$ recognizes that it has not received a "hello message" from node $3_4$ since the last reception of a "hello message" from node $3_4$ within a given time interval, and has therefore moved out of the transmission range of node $3_4$. Accordingly, at transmission time (19) node $3_1$ transmits a "hello message" which contains only information about the still remaining adjacent nodes $3_2$ and $3_3$ and only reaches node $3_2$.

Only node $3_2$ receives this "hello message" of node $3_1$ at the reception time (20) and, on the basis of this "hello message", recognizes that node $3_1$ has moved out of the transmission range of node $3_4$, but, at this time (20), continues to synchronize its local time with the local time of node $3_1$ acting as its local time master.

At time (28), node $3_3$ recognizes that node $3_1$ has moved out of its transmission range, since it has recently not received a "hello message" from node $3_1$ within a specified time interval (especially the "hello messages" of node $3_1$ which node $3_2$ received at the reception times (20) and (26)), and, at the next transmission times (31), (37) and (43), transmits a "hello message" which contains only information about the still remaining adjacent nodes $3_2$ and $3_4$. Node $3_3$ specifies node $3_2$ as its local time master for the synchronization of its local time, since node $3_2$ provides the lowest MAC address of all of the nodes $3_2$, $3_3$ and $3_4$ still disposed in the remaining ad-hoc network. At the next reception times (30), (36) and (42) of a "hello message" of node $3_2$, node $3_3$ accordingly synchronizes its local time with the local time of node $3_2$ acting as the local time master.

At time (33), node $3_1$ finally also moves out of the transmission range of node $3_2$. The removal of node $3_1$ out of the transmission range of node $3_2$ is recognized by node $3_2$ at time (46). Node $3_2$ remains the local time master of node $3_3$ and node $3_4$ of the remaining ad-hoc network and need not therefore synchronize its local time to the local time of another node.

Figure 8:
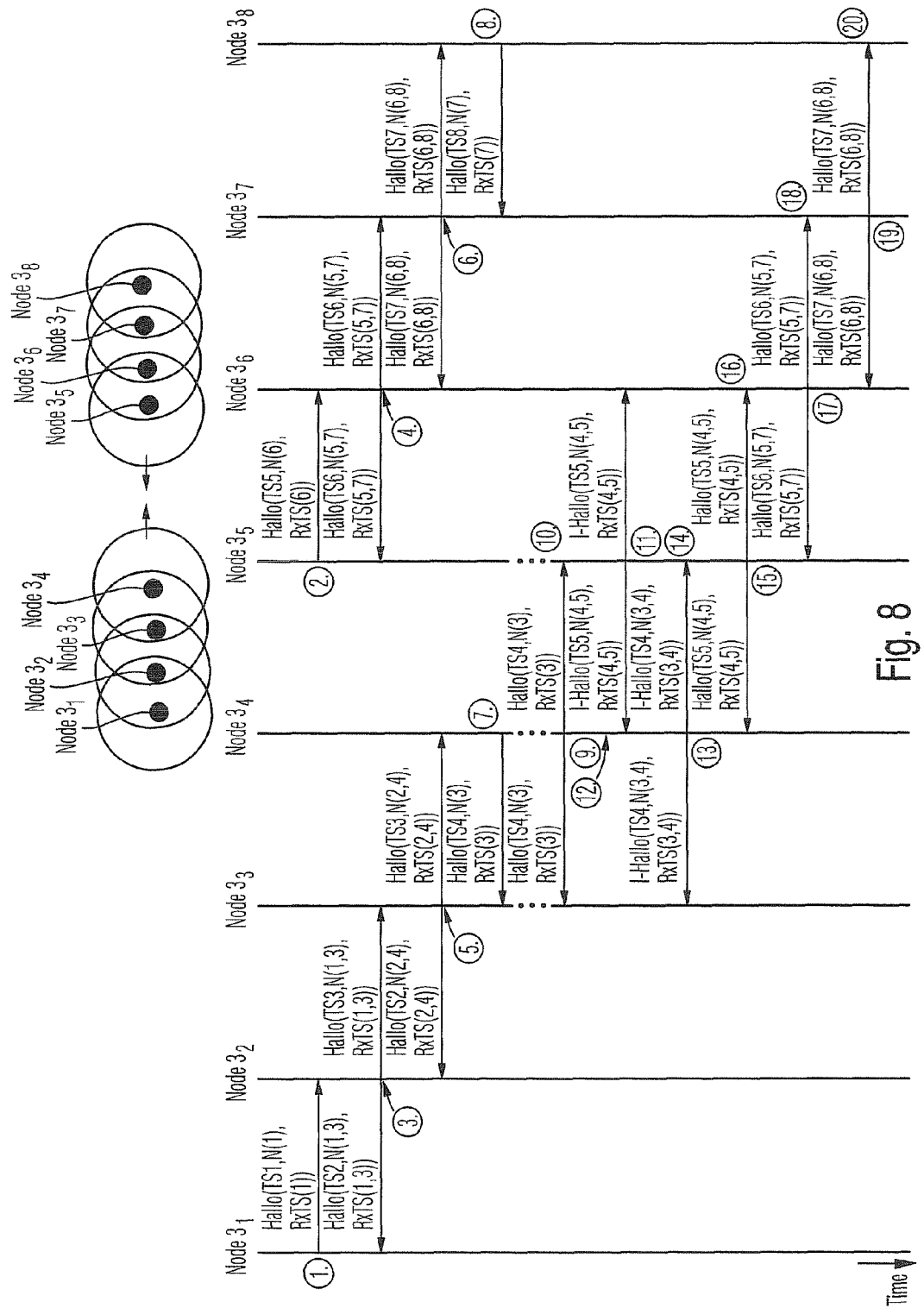
FIG. 8 an exemplary presentation of a seventh scenario for an ad-hoc network and a time diagram of the messages transmitted between the participating nodes.

In the seventh scenario in FIG. 8, two partial ad-hoc networks comprising the nodes $3_1$, $3_2$, $3_3$ and $3_4$ on the one hand and the nodes $3_5$, $3_6$, $3_7$ and $3_8$ on the other hand combine to form a single combined ad-hoc network.

In the original configuration, node $3_1$ forms a symmetrical transmission connection with node $3_2$, while node $3_2$ additionally forms a symmetrical transmission connection with node $3_3$, which in turn forms a symmetrical transmission connection with node $3_4$. Node $3_1$ acts as local time master for node $3_2$ while node $3_3$ acts as local time master for node $3_2$, and node $3_4$ acts as local time master for node $3_3$. In an equivalent manner, node $3_5$ forms a symmetrical transmission connection with node $3_6$, while node $3_6$ additionally forms a symmetrical transmission connection with node $3_7$, which in turn forms a symmetrical transmission connection with node $3_8$. Node $3_5$ acts as local time master for node $3_6$, while node $3_7$ acts as local time master for node $3_6$, and node $3_8$ acts as local time master for node $3_7$.

The individual nodes i each transmit a "hello message" to their respective adjacent nodes within their respective cyclical time frame $\Delta T_i$. At time (1), node $3_1$ transmits a "hello message" with information about its identified adjacent node $3_2$. At transmission time (2), node $3_5$ transmits a "hello message" with information about its identified adjacent node $3_6$. At time (3), node $3_2$ transmits a "hello message" with information about its identified adjacent nodes $3_1$ and $3_3$. At time (4), node $3_6$ transmits a "hello message" with information about its identified adjacent nodes $3_5$ and $3_7$. At time (5), node $3_3$ transmits a "hello message" with information about its identified adjacent nodes $3_2$ and $3_4$. At time (7), node $3_7$ transmits a "hello message" with information about its identified adjacent nodes $3_6$ and $3_8$. At time (4), node $3_4$ transmits a "hello message" with information about its identified adjacent node $3_3$. At time (8), node $3_8$ transmits a "hello message" with information about its identified adjacent node $3_7$.

At a later time (9), node $3_4$ once again transmits a "hello message" with information N(3) about its identified adjacent node $3_3$ which is received not only by the adjacent node $3_3$, but also, at time (10), by node $3_5$ of the respectively other partial ad-hoc network, which is disposed within the transmission range of node $3_4$. Since, at the first moment, node $3_4$ is an alien node for node $3_5$, it acknowledges the reception of the "hello message" from node $3_4$ at time (11) with an "I-hello message" with information N(4, 6) about its identified adjacent nodes $3_4$ and $3_6$ which is received by node $3_4$ at time (12). Since, at the first moment, node $3_5$ is also an alien node for node $3_4$, node $3_4$ will transmit an "I-hello message" with information N(3, 5) about its identified adjacent nodes $3_3$ and $3_5$ immediately after the reception of the "I-hello message" from node $3_5$ at time (13).

Since one of the nodes $3_1$, $3_2$, $3_3$ and $3_4$ of the ad-hoc network shown on the left in FIG. 8 provides the lowest MAC address of all of the nodes $3_1$, $3_2$, $3_3$, $3_4$, $3_5$, $3_6$, $3_7$ and $3_8$ to be integrated in future in a single ad-hoc network, node $3_4$ is specified as the local time master not only by node $3_3$ of the ad-hoc network shown on the left in FIG. 8, but also by node $3_5$ of the ad-hoc network shown on the right in FIG. 8. At the reception time (14) of the "I-hello message" from node $3_4$ by node $3_5$, a symmetrical transmission connection exists between node $3_4$ and node $3_5$, since both nodes $3_4$ and $3_5$ have each recognized at this time (14) that a correct transmission from node $3_4$ to node $3_5$ and from node $3_5$ to node $3_4$ exists. At the reception time (14) of the "I-hello message" of node $3_4$ by node $3_5$, node $3_5$ synchronizes its local time with the local time of node $3_4$ acting as the local time master from the time information transmitted in the "I-hello message".

Using the time information in the "hello message" transmitted from node $3_5$ at time (15), which node $3_6$ receives at time (16), node $3_6$ synchronizes its local time with the local time of node $3_5$ acting as its local time master. In an equivalent manner, node $3_7$ synchronizes its local time with the local time of node $3_6$ acting as its local time master using the time information in the "hello message" transmitted by node $3_6$ at time (17), which node $3_7$ receives at time (18). Node $3_8$ also synchronizes its local time with the local time of node $3_7$ acting as its local time master using the time information from the "hello message" transmitted by node $3_7$ at time (19), which node $3_8$ receives at time (20).

Figure 9:
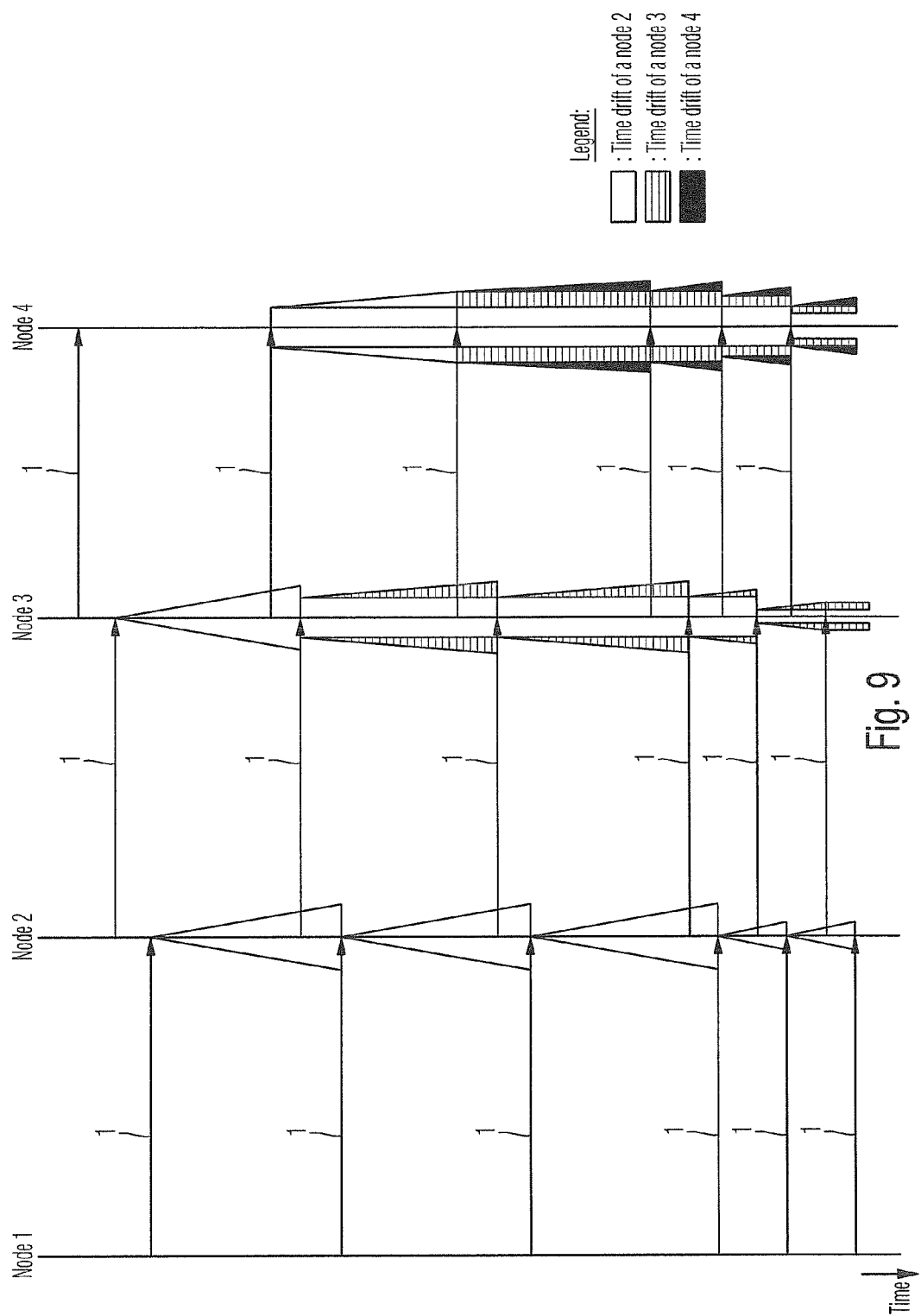
FIG. 9 an exemplary presentation of a time diagram of the time accuracies occurring in individual nodes of an ad-hoc network respectively.

Finally, it should be mentioned that the local time of every node inside or outside an ad-hoc network provides a certain time inaccuracy because of a clock drift of the clock generator implemented in every node to generate the local time. The characteristic of the time inaccuracy of the local time realized in a node is shown in FIG. 9 in each case for four nodes. These four nodes each synchronize their local time in a serial manner with an adjacent node acting as local time master. Node 2 synchronizes its local time with the local time of node 1; node 3 synchronizes its local time with the local time of node 2 and so on. From the synchronization time at which the time inaccuracy of the respective local time is minimal, the time inaccuracy of the respective local time rises in a linear manner until it is synchronized again.

Through a reduction of the synchronization interval by reducing the cyclical time frame in which a "hello message" is transmitted respectively from each node acting as local time master, a minimization of the time inaccuracy of the local time realized in a node can be realized, as is evident from FIG. 9. By preference, the time at which a "hello message" for time synchronization is transmitted by the respective local time master is calculated in advance in order to maintain a maximum permitted time inaccuracy in the node to be synchronized.

The invention is not restricted to the embodiment and the scenarios presented. All combinations of any of the features claimed in the claims, any of the features disclosed in the description and any of the features illustrated in the figures of the drawings are also covered by the invention.

The invention claimed is:

1. A method for time synchronization in a mobile ad-hoc network, comprising:
    transmitting by every node of the mobile ad-hoc network of a message signalling a presence, in each case within a given time frame,
    acknowledging by every node disposed within the transmission range of the transmitting node of the received message signalling a presence, in each case with an acknowledgement message,
    specifying of that node of two nodes disposed within the transmission range of one another with the local time of which the respectively other node synchronizes its local time, on the basis of information in an acknowledgement message which is received by one of the two nodes, and
    synchronizing of the local time of the nodes with the local time of the respective specified node,
    wherein of the two nodes disposed within the transmission range of one another, that node is specified, of which the local time provides maximum time accuracy or which is integrated in another ad-hoc network with a node of which the local time provides the maximum time accuracy.

2. The method according to claim 1, wherein in the case of an ad-hoc network formed from only two nodes of which the local times provide an identical time accuracy, that node is specified which first transmits an acknowledgement message to a message signalling a presence of the two nodes.

3. The method according to claim 1, wherein in the case of an identical time accuracy of all of the nodes integrated in the ad-hoc network to be formed, that node of the two nodes disposed within the transmission range of one another is specified which already forms an ad-hoc network with a relatively larger number of nodes.

4. The method according to claim 1, wherein in the case of an identical time accuracy of all of the nodes integrated in the ad-hoc network to be formed and with an identical number of nodes with which the two nodes disposed within the transmission range of one another each form an ad-hoc network, that node is specified of which the ad-hoc network provides a relatively lower identity code.

5. The method according to claim 4, wherein the identity code of the ad-hoc network is the Medium-Access-Control address of the ad-hoc network.

6. The method according to claim 1, wherein in the case of an ad-hoc network from which at least one node is removed, that node of the remaining ad-hoc network which provides the local time with the maximum time accuracy is specified, with the local time of which the remaining nodes of the ad-hoc network each synchronize their local time.

7. The method for time synchronization according to claim 6, wherein in the case of an ad-hoc network from which at least one node is removed and in the case of an identical time accuracy of the local times of the nodes of the remaining ad-hoc network, that node of the remaining ad-hoc network is specified which provides the maximum number of directly adjacent nodes.

8. The method according to claim 6, wherein in the case of an ad-hoc network from which at least one node is removed and in the case of an identical time accuracy of the local times of the nodes of the remaining ad-hoc network and in the case of an identical number of respectively directly adjacent nodes for each node of the remaining ad-hoc network, that node of the remaining ad-hoc network is specified which provides the lowest identity code.

9. The method according to claim 6, wherein the removal of a node from an ad-hoc network is identified if no further message signalling a presence of the moving node has been received from any of the other nodes of the remaining ad-hoc network since the last reception time of a message signalling a presence of the moving node within a constant time frame in which, respectively, a message signalling a presence is transmitted.

10. The method according to claim 1, wherein a node of an ad-hoc network from which a node, with the local time of which the node of the ad-hoc network previously synchronized its local time, is removed, specifies another node of the remaining ad-hoc network disposed within its transmission range, with the local time of which it synchronizes its local time.

11. The method according to claim 1, wherein the synchronization of the local time of the nodes which each form an ad-hoc network with one of the two nodes disposed within the transmission range of one another is realized at the local time of the specified node, in that every node of the respective ad-hoc network specifies a directly adjacent node of the ad-hoc network as the node with the local time of which it synchronizes its local time.

12. The method according to claim 1, wherein the synchronization of the local time of a node with the local time of the specified node is implemented in that the specified node communicates to the node the reception time of the message transmitted from the node in order to update a presence or an acknowledgement message at the local time of the specified node and the transmission time of a message transmitted to the node in order to signal a presence or an acknowledgement message.

13. The method according to claim 12, wherein the synchronization of the local time of a node with the local time of the specified node takes place with every reception of a message signalling a presence or an acknowledgement message of the specified node.

14. The method according to claim 1, wherein a constant time frame in which the node transmits a message updating a presence is minimised in order to reduce the influence of a clock-pulse drift on the time accuracy of the local time of a node.

15. The method according to claim 14, wherein the node calculates the transmission time of the message updating a presence in order to limit the influence of the clock-pulse drift on the time accuracy of the local time of the node.

16. A system for time synchronization within a mobile ad-hoc network comprising several nodes each transmitting a message signalling a presence, in each case within a given time frame,
   whereas an acknowledgement of the message signalling a presence is implemented by means of an acknowledgement message by every node disposed within the transmission range of the node transmitting a message signalling a presence,
   whereas, in each case from two nodes disposed within the transmission range of one another, a node is specified with the local time of which the local time of the respectively other node is synchronized,
   whereas the specification of the node is implemented on the basis of information in the acknowledgement message received from one of the two nodes disposed within the transmission range of one another, and
   whereas of the two nodes disposed within the transmission range of one another, that node is specified, of which the local time provides maximum time accuracy or which is integrated in another ad-hoc network with a node of which the local time provides the maximum time accuracy.

17. A method for time synchronization in a mobile ad-hoc network, comprising:
   transmitting by every node of the mobile ad-hoc network of a message signalling a presence, in each case within a given time frame,
   acknowledging by every node disposed within the transmission range of the transmitting node of the received message signalling a presence, in each case with an acknowledgement message,
   specifying of that node of two nodes disposed within the transmission range of one another with the local time of which the respectively other node synchronizes its local time, on the basis of information in an acknowledgement message which is received by one of the two nodes, and
   synchronizing of the local time of the nodes with the local time of the respective specified node,
   wherein in the case of an ad-hoc network formed from only two nodes of which the local times provide an identical time accuracy, that node is specified which first transmits an acknowledgement message to a message signalling a presence of the two nodes.

* * * * *